Jan. 14, 1941.     C. T. WRIGHT ET AL     2,228,863
FEEDING DEVICE
Filed Jan. 3, 1939
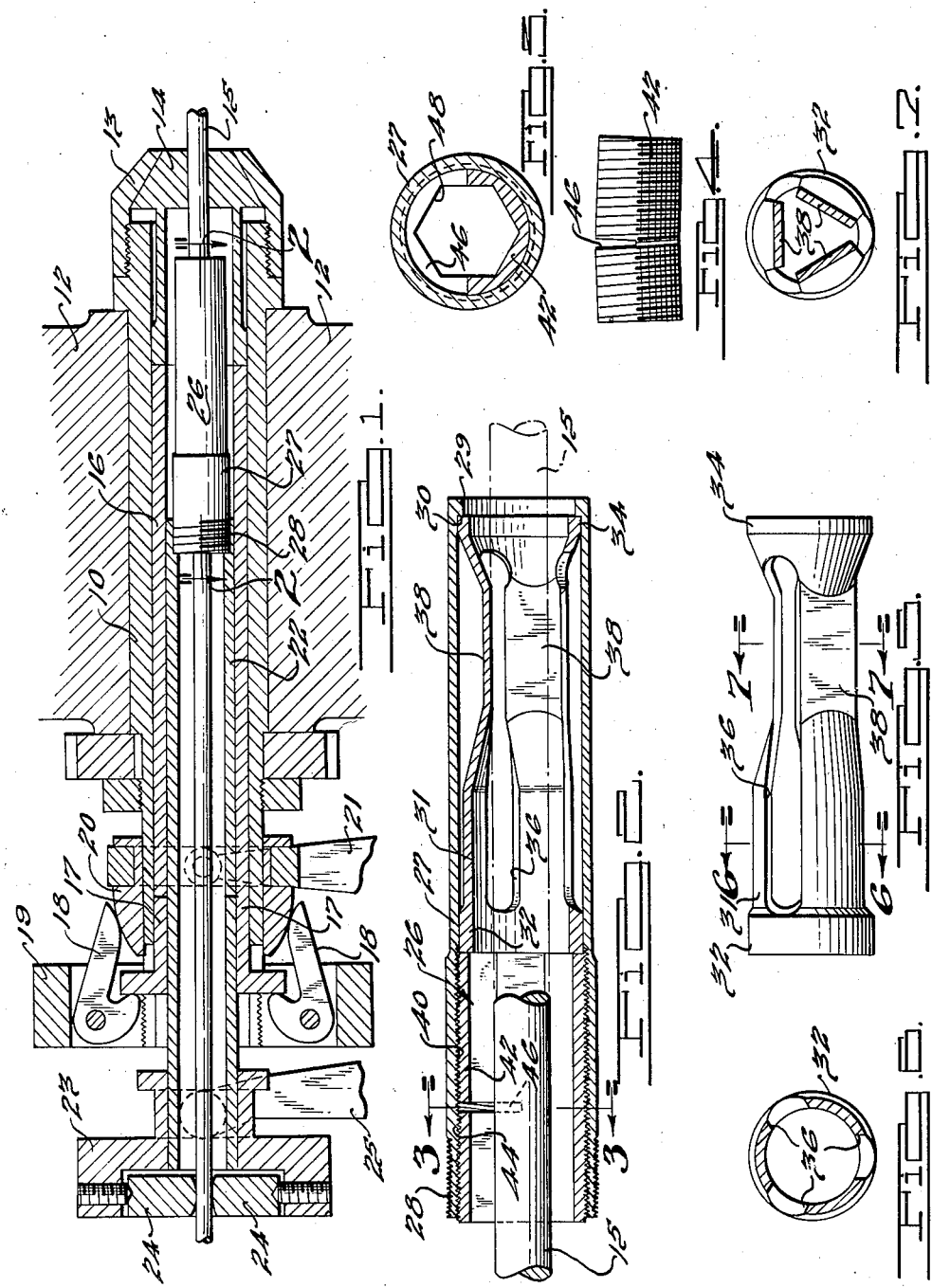
INVENTORS.
Carroll T. Wright,
George B. Peters,
BY
Harness, Dickey & Pierce
ATTORNEYS.

Patented Jan. 14, 1941

2,228,863

UNITED STATES PATENT OFFICE 2,228,863

FEEDING DEVICE

Carroll T. Wright, Hazel Park, and George B. Peters, Detroit, Mich., assignors to Clarence M. Sutton, Detroit, Mich.

Application January 3, 1939, Serial No. 248,930

2 Claims. (Cl. 29—62)

The present invention relates to an improved feeding device or an improved feeding collet which is adapted to frictionally embrace a piece of rod stock, or similar member, for intermittently advancing the stock to a position for a machining operation on the leading end thereof, and at the termination of such operation, successively advancing the rod for the operation of the succeeding portion of the stock.

The present invention is particularly adapted for use on single and multiple spindle automatic or hand operated machines used for performing various kinds of operations, such as screw machine operations, on a piece of stock which includes a tubular or hollow spindle through which the piece of stock may be intermittently advanced and fed so that a portion of the stock will be presented for an operation thereon, may then be cut off, and then another succeeding portion of the stock is advanced for the operation thereon. To accomplish this, the tubular or hollow spindle of the machine includes a chuck and a pushing device, both of which are disposed and operated in timed relation for advancing and holding a piece of work, which is the stock mentioned. Associated with the devices is ordinarily a gripping device for the piece of work or stock which consists of a tube through which the work is shifted. In one prior type of shifting device, the tube has the ends thereof slotted or bifurcated to provide resilient arms which frictionally engage the piece of work and prevent accidental displacement thereof in the tube. The resilient arms, due to constant use, soon lose their gripping power and must be repeatedly tempered or otherwise repaired, thus requiring considerable labor and time, besides interfering with operations being expeditiously carried on due to the fact that the piece of work will often slip in the gripping device.

One of the primary objects of the present invention is to provide an improved gripping and shifting means for use in machines of the type mentioned which may be readily adjusted for size as well as for applied gripping force.

Another object of the invention is to provide an improved gripping means which can be adjusted while it is in the machine.

Another object of the invention is to provide an improved gripping means which is adjustable and which can be used for hexagonal or round stocks.

Another object of the invention is to provide an adjustable gripping device having threaded parts in which the threads are protected from contact with the stock at all times.

Other objects of the invention will become apparent from the following specification, the drawing relating thereto, and from the claims hereinafter set forth.

In the drawing, in which like numerals are used to designate like parts in the several views throughout:

Figure 1 is a longitudinal cross-sectional view of the spindle of an automatic machine provided with a feed device or collet in accordance with the present invention, in which the feeding device is shown in elevation;

Fig. 2 is an enlarged, longitudinal cross-sectional view taken substantially along the line 2—2 of Fig. 1;

Fig. 3 is a cross-sectional view taken substantially along the line 3—3 of Fig. 2;

Fig. 4 is a side elevational view of a threaded sleeve used with the device of the present invention;

Fig. 5 is a side elevational view of the gripping element used with the present invention;

Fig. 6 is a cross-sectional view taken substantially along the line 6—6 of Fig. 5; and Fig. 7 is a cross-sectional view taken substantially along the line 7—7 of Fig. 5.

Referring to the drawing, in order that the position and use of the improved feeding collet may be understood in connection with the spindle of one illustrative type of an automatic machine, a tubular spindle 10 is illustrated as being journaled in bearing 12 of an automatic machine. The outer end of the spindle 10 has a chuck including a nose piece 13 and a chuck collet or chuck members 14, which, when contracted, are adapted to grip and hold a piece of work or stock 15 axially of the spindle 10. The piece of stock in this case is illustrated as being a round rod, but it may be hexagonal in shape as well, that may be fed or intermittently advanced through the spindle 10 so that the leading end of the rod may have machine operations performed thereon, such as are performed with automatic screw machinery.

In the spindle 10 is a chuck sleeve 16 abutting the chuck members 14, which is adapted to shift the chuck members against the nosepiece 13 and contract the chuck members 14 so that they grip the leading end of the rod 15 while the machine operations are being performed thereon. The inner end of the chuck sleeve 16 is engaged by head 17 actuated by pivot fingers 18 in a holder 19. The fingers 18 are shifted by a cam 20 which is slidable on the inner end of the spindle 10 and actuated through the medium of a control lever 21. The control lever 21 may be shifted to impart movement to the fingers 18, the head 17, the sleeve 16, and the chuck members 14, so that the rod 15 may be gripped and held, or released, as the case may demand.

In the chuck sleeve 16 is a pusher sleeve 22, and it is axially of this pusher sleeve 22 that the rod 15 extends. The inner end of the pusher sleeve 22 is provided with a center guide including a holder 23 for fulcrum jaws 24. The center guides 23 in the sleeve 22 are actuated through the medium of a lever 25 which is adapted to be operated in timed relation to the lever 21. In other words, when the outer chuck is retracted, to release the piece of work 15, the center guide may grip the rod 15 and center and steady it while it is being advanced in the pusher sleeve 22.

In order to intermittently advance the rod 15 after each machine operation has been completed on that portion adjacent the leading end thereof, an improved feeding collet, generally indicated at 26, according to the present invention, is provided. The feeding collet 26 includes a tubular housing 27 having the inner end thereof exteriorly threaded as indicated at 28, so that it may be screwed into the outer end of the pusher sleeve 22.

The outer or leading end of the housing 27 is provided with an inwardly disposed annular abutment flange 29 which forms an annular shoulder 30 interiorly of the sleeve 27. A gripping element or collet 31 is adapted to be disposed within the tubular housing 27 and serves to frictionally grip the rod or stock 15 which extends therethrough. The gripping element 31 is preferably made from a single piece of tubular metal material and comprises rigid, longitudinally aligned cylindrical end portions 32 and 34 connected by an intermediate longitudinally slotted portion, the slots being indicated at 36. There are preferably three of such longitudinally extending slots 36 provided at equal distances around the intermediate portion so that either a round rod or a hexagonal rod may be properly engaged by the gripping element.

Portions 38 of the intermediate portion are inbent to provide a plurality of circumferentially disposed stock engaging members or jaws which are adapted to frictionally engage the stock and shift the stock through such jaws so that the leading end thereof is presented in the proper position for machine operation thereon. The inbent portions 38 are preferably flattened so that they engage with line contact the round bar stock and also so that they may be flexed for adjustment in a manner that will become more apparent from the following description. The intermediate portions 38 are inherently resilient due to the slotted construction assisted by the flattened construction so that these engaging portions may be flexed to adjust the size of opening therethrough and to permit the shifting of the stock therethrough as the feeding device 26 is reciprocated.

The gripping element 31 is disposed within the housing 27 and may be disposed with either end forward. In the embodiment illustrated, the end 34 is disposed toward the leading end of the housing 27 so that the end 34 abuts against the annular shoulder 30.

The following end of the housing 27 is adapted to be internally threaded over a substantial portion of its length, as indicated at 40. An adjustable sleeve 42 which is externally threaded, as indicated at 44, is adapted to be threadedly received within the following end of the housing 27 and is adapted to abut against the following end of the gripping element 31. The element 42 is preferably of such a length relative to the length of the threaded portion 40 that the interior threads 40 are at all times protected against blows from the leading end of the stock 15 when the stock is being inserted.

In order to get a friction lock of the element 42 within the housing 27, the element 42 is transversely slotted as indicated at 46, and its longitudinal axis is deformed so that the axis is not truly straight. This slot and deformation are shown in an exaggerated form in Fig. 4 for purpose of illustration; and it will be appreciated that when the element 42 is threaded into the following end of the housing 27, this slight distortion will serve to frictionally lock the element 42 in position against displacement. The inner wall of the sleeve 42 is preferably so shaped that it may receive a turning tool complementary in shape, and in the embodiment illustrated, the inner wall 48 is shown as being hexagonal in shape.

It will be appreciated that as the element 42 is threaded within the housing 27 it abuts against the following end of the gripping element 31. The leading end of the element 31 abuts against the shoulder 30; and as the element 42 is tightened within the housing, the length of the element 31 is shortened. This shortening of the length results in the inward flexing of the gripping arm and particularly the inward flexing of the portion 38. The result of this is an effective reduction in the size of the opening through the gripping element 31 so that the size of this opening may be readily adjusted. The range of adjustment for such opening is from one-eighth inch to one-quarter inch, depending upon the size of the collet.

Instead of having the forward end 34 of the gripping element 31 closed, as illustrated, the slots 36 may extend completely through the portion 34. This would form resilient arms open through the forward end and the ends of such arms would be confined by the housing 27 and abut against the shoulder 30 so that the adjustment described above could still be accomplished.

It will be evident that the adjustment may be effected without removing the gripping and shifting means 26 from the machine. This may be accomplished when the stock 15 is not in the machine by the insertion of an elongated tool through the inner end of the sleeve 22 through which it may be inserted into the sleeve 42. Such tool would, of course, have a cross-sectional shape complementary to the cross-sectional shape of the inner wall of the sleeve 42.

The fact that the gripping arms or jaws of the element 31 may be adjusted to vary the size of the effective opening therethrough, serves a number of functions. One is to take up wear, or to vary the size of the opening for variations in size of stock. Another is to adapt the gripping element 31 to properly grip differently shaped stock.

In operation, the levers 21 and 25 are automatically operated in timed relation to each other so that at the completion of a machine operation on the leading end of the rod 15, the chuck members 14 are released and the lever 25 is actuated so that the feed or shifting device 26 is moved toward the chuck a predetermined distance. The gripping portions 38 of the gripping element 31 grip the rod 15 and move it through the chuck members 14 this predetermined distance. The lever 21 is then actuated so that the rod 15 is gripped by the chuck members 14, and, with the rod 15 so held, the lever 25 is operated so that the feeding device 26 is shifted away from the chuck member by sliding along the rod 15 so that it is retracted to its initial position. These operations are repeated and it will be evident that the rod 15 is thus intermittently fed through the chucks 14 so that successive machine operations may be performed on that portion of the rod 15 adjacent the leading end thereof.

Formal changes may be made in the specific embodiment of the invention described without departing from the spirit and substance of the invention, the scope of which is commensurate with the appended claims.

What is claimed is:

1. In a machine having a hollow spindle adapted to have an elongated workpiece extend therethrough with a chuck operatively associated with the spindle for intermittently gripping and releasing the workpiece, the combination of a feeding device disposed within said spindle comprising an elongated housing open through its ends, said housing being internally threaded adjacent one end thereof, an elongated hollow member having inbent portions intermediate the ends thereof providing gripping elements adapted to frictionally engage said workpiece disposed within the other end of said housing, means associated with said housing engaging one end of said member to limit movement of said member in one direction, an externally threaded sleeve threadably received within the threaded end of said housing engaging the other end of said member to compress said member longitudinally and to thereby radially adjust said gripping elements.

2. In a machine having a hollow spindle adapted to have an elongated workpiece extend therethrough with a chuck operatively associated with the spindle for intermittently gripping and releasing the workpiece, the combination of a feeding device disposed within said spindle comprising an elongated housing open through its ends, said housing being internally threaded adjacent one end thereof and having a radially directed abutment formed on the other end thereof, an elongated hollow member having inbent portions intermediate the ends thereof providing gripping elements adapted to frictionally engage said workpiece disposed within the end of said housing adjacent said abutment, said member bearing against said abutment to limit longitudinal movement of said member in one direction, an externally threaded sleeve threadably received within the threaded end of said housing adapted to engage said member to compress said member and radially adjust said gripping elements, said sleeve being provided with a transverse slot and being distorted about its longitudinal axis to frictionally lock said sleeve within said housing.

CARROLL T. WRIGHT.
GEORGE B. PETERS.